C. C. HAYDEN.
PULLEY.
APPLICATION FILED MAR. 15, 1919

1,314,190.

Patented Aug. 26, 1919.

Clyde C. Hayden
Inventor

UNITED STATES PATENT OFFICE.

CLYDE C. HAYDEN, OF OKMULGEE, OKLAHOMA.

PULLEY.

1,314,190.   Specification of Letters Patent.   Patented Aug. 26, 1919.

Application filed March 15, 1919. Serial No. 282,913.

*To all whom it may concern:*

Be it known that I, CLYDE C. HAYDEN, a citizen of the United States, residing at Okmulgee, in the county of Okmulgee and State of Oklahoma, have invented certain new and useful Improvements in Pulleys, of which the following is a specification.

This invention relates to a fan belt drive pulley for use on "Ford" automobiles and an object of the invention is to provide a flanged pulley which is connected to the crank shaft of a motor or engine by crank bracket pins and which will prevent the belt from slipping off the pulley, eliminating many inconveniences contingent with the usual type of pulleys employed.

A further object of the invention is to pass the crank ratchet pin through the pulley from one side thereof to practically the other side, seating the ends of the pin in the rim of the pulley, thereby distributing the strain of the starting crank and the driving of the belt at diametrically opposed points or portions of the pulley, resulting in the increasing of the longevity of the pulley as well as preventing loss of the pin in case of wear on the pulley and pin.

Other objects of the invention will appear in the following detailed description taken in connection with the accompanying drawing forming a part of this specification and in which drawing.

Referring more particularly to the drawings, 1 indicates a crank shaft of a motor or engine of a "Ford" automobile, upon the forward end of which the improved pulley 5 is mounted. The pulley 5 is formed, to include the rim 6 which is flanged, upon both edges as shown at 7, and which rim is connected to the hub 8 of the pulley by a web 9 at the inner edge or end of the pulley.

Figure 1:
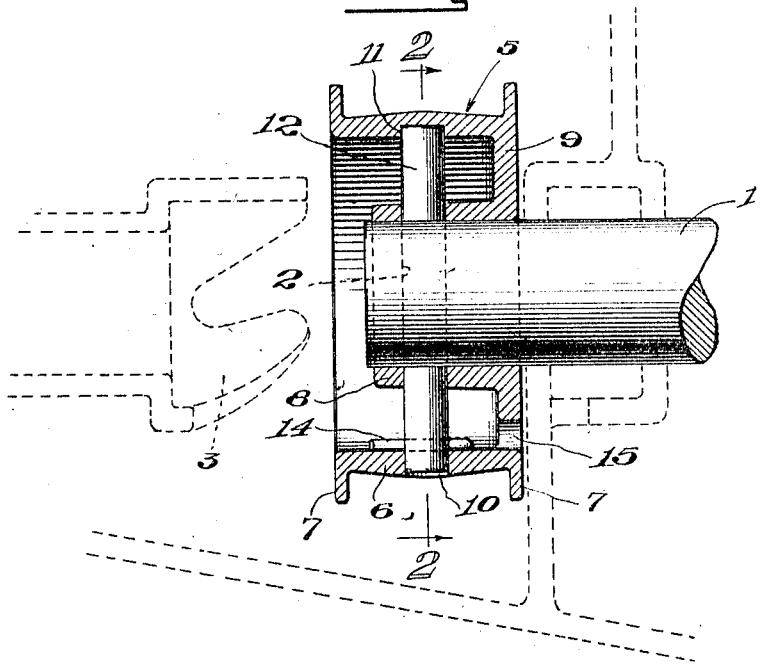
Figure 1 is a section through the pulley showing it applied.
Figure 2:
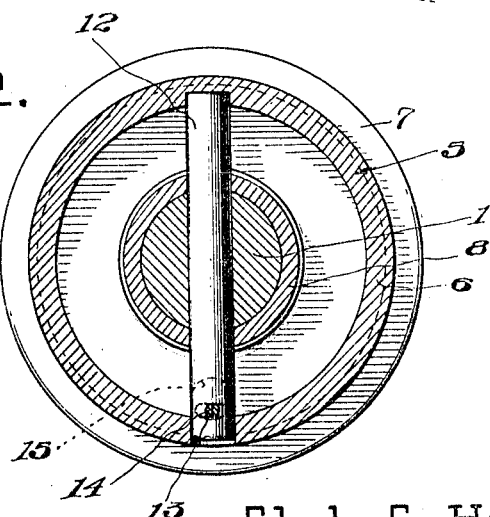
Fig. 2 is a section on the line 2—2 of Fig. 1.

The pulley 5 is provided with an opening 10 extending through the rim thereof and with a recess 11 extending into the rim from the inner surface thereof, diametrically opposite of the opening 10. This opening 10 and recess 11 are adapted for registration with an opening 2 which extends diametrically through the forward end of the shaft 1, to permit the insertion of the ratchet crank pin 12 therethrough, one end of which pin seats in the recess 11 while the other end is engaged in the opening 10, for distributing the strain caused by the rotation of the shaft, through the medium of the crank ratchet indicated at 3, in dotted lines in Fig. 1 of the drawings, and also for distributing the strain of the pawl of the fan belt which is adapted to pass about the pulley 5. The pin 12 is provided with a diametrically extending keyway 13 near one end thereof which receives an ordinary split key 14. This split key 14 is adapted to engage the inner surface of the rim 6 adjacent the opening 10 and the web 9 is provided with an opening 15 to permit the guiding of the split key 14 into the keyway 13.

Changes in details may be made without departing from the spirit of this invention, but;

I claim:

1. In combination, a fan belt pulley including a hub and a rim provided with openings extending through the rim and hub and with a recess in the inner surface of the rim in diametrical alinement with said openings, and a ratchet-crank pin extending through said openings and having one end seated in said recess and the other end seated in said opening.

2. In combination, a fan belt pulley including a hub and a rim provided with openings extending through the rim and hub and with a recess in the inner surface of the rim in diametrical alinement with said openings, a ratchet-crank pin extending through said openings and having one end seated in said recess and the other end seated in said opening, and a key extending diametrically through said pin and engaging the inner surface of said rim.

3. In combination, a fan belt pulley including a hub, a rim, a web connecting said hub and rim at one edge thereof, said hub and rim provided with openings extending therethrough, said rim having a recess in its inner surface in diametrical alinement with said openings, a ratchet-crank pin extending through said openings and having one end seated in said recess and the other end seated in said opening, and a key extending diametrically through said pin and engaging the inner surface of said rim, said web provided with an opening to permit the driving of said key through said pin.

4. A fan belt pulley including a hub and a rim provided with openings extending through the rim and hub and with a recess in the inner surface of the rim in diametrical alinement with said openings.

5. A fan belt pulley including a hub and a flanged rim provided with openings extending through the rim and hub and with a recess in the inner surface of the rim in diametrical alinement with said openings, a web connecting said hub and rim, said web provided with an opening extending therethrough radially of the opening extending through said rim.

CLYDE C. HAYDEN.